(12) United States Patent
Reinhardt et al.

(10) Patent No.: US 8,142,115 B2
(45) Date of Patent: Mar. 27, 2012

(54) TWIST DRILL FOR DRILLING WITH A COUNTERSINK CUTTING ARRANGEMENT, AND A CUTTING TOOL WITH A COUNTERSINK CUTTING ARRANGEMENT, AND A CUTTING-CHAMFERING TOOL

(75) Inventors: Werner Reinhardt, Unterleinleiter (DE); Jürgen Schwägerl, Vohenstrause (DE); Petra Holzner, Nürnberg (DE)

(73) Assignee: Kennametal Inc., Latrobe, PA (US)

( * ) Notice: Subject to any disclaimer, the term of this patent is extended or adjusted under 35 U.S.C. 154(b) by 1294 days.

(21) Appl. No.: 11/756,998

(22) Filed: Jun. 1, 2007

(65) Prior Publication Data

US 2008/0232915 A1 Sep. 25, 2008

(30) Foreign Application Priority Data

Dec. 2, 2004 (DE) .......................... 10 2004 058 163

(51) Int. Cl.
*B23B 51/10* (2006.01)
(52) U.S. Cl. ........................................ 408/191; 408/224
(58) Field of Classification Search .................. 408/191, 408/192, 193, 196, 197, 224, 225, 230, 713
See application file for complete search history.

(56) References Cited

U.S. PATENT DOCUMENTS

| | | | | |
|---|---|---|---|---|
| 2,859,645 A | * | 11/1958 | Emmons et al. | 408/230 |
| 4,353,670 A | * | 10/1982 | Jorgensen | 408/193 |
| 4,704,055 A | * | 11/1987 | Guhring | 408/59 |
| 4,898,503 A | * | 2/1990 | Barish | 408/230 |
| 5,211,635 A | * | 5/1993 | Omi et al. | 408/224 |
| 5,678,960 A | * | 10/1997 | Just et al. | 408/230 |
| 5,816,754 A | * | 10/1998 | Shallenberger | 408/227 |
| 6,238,151 B1 | | 5/2001 | Takagi | |
| 2002/0041798 A1 | * | 4/2002 | Karlsson | 408/118 |
| 2006/0120814 A1 | * | 6/2006 | Lipohar et al. | 408/181 |

FOREIGN PATENT DOCUMENTS

| | | | |
|---|---|---|---|
| DE | 7729079 | | 12/1977 |
| DE | 3125480 A1 | * | 1/1983 |
| DE | 3610016 A1 | * | 10/1987 |
| DE | 92 06 148 | | 7/1992 |

(Continued)

OTHER PUBLICATIONS

International Search Report PCT/EP2005/012560 and English translation thereof.

(Continued)

*Primary Examiner* — Daniel Howell
*Assistant Examiner* — Paul M Janeski
(74) *Attorney, Agent, or Firm* — Larry R. Meenan

(57) ABSTRACT

A twist drill for drilling with a countersink cutting arrangement, and a cutting tool with a countersink cutting arrangement, and a cutting-chamfering tool. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 6 Drawing Sheets

FOREIGN PATENT DOCUMENTS

| | | |
|---|---|---|
| DE | 103 31 328 | 4/2004 |
| EP | 0 519 233 | 12/1992 |
| EP | 0 684 099 | 11/1995 |
| EP | 0712 343 | 5/1996 |
| EP | 0 893 185 | 1/1999 |
| JP | 57201113 A * | 12/1982 |
| JP | 58051914 U | 4/1983 |
| JP | 59219108 A | 12/1984 |
| JP | 63-052908 | 3/1988 |
| JP | 07-112311 | 5/1995 |
| JP | 08174362 A * | 7/1996 |
| JP | 9501109 T | 2/1997 |
| WO | WO 94/25210 | 11/1994 |
| WO | WO 98/42469 | 10/1998 |

OTHER PUBLICATIONS

Japanese Patent Office, Notice of Reasons for Rejection (Office Action), and English language translation thereof, Jul. 14, 2011, 6 pp.

* cited by examiner

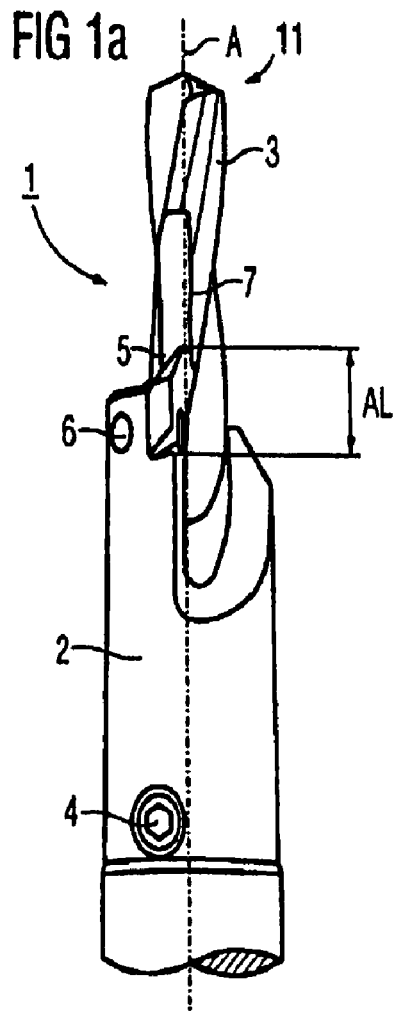
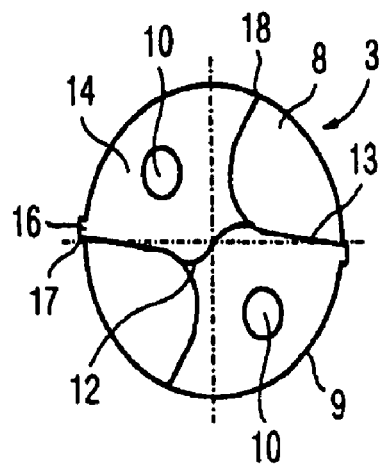
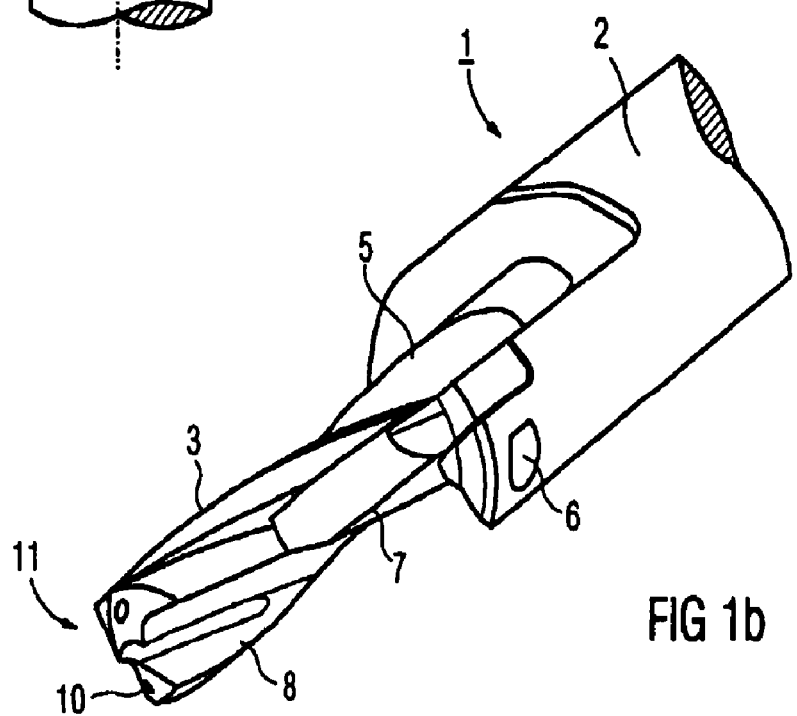

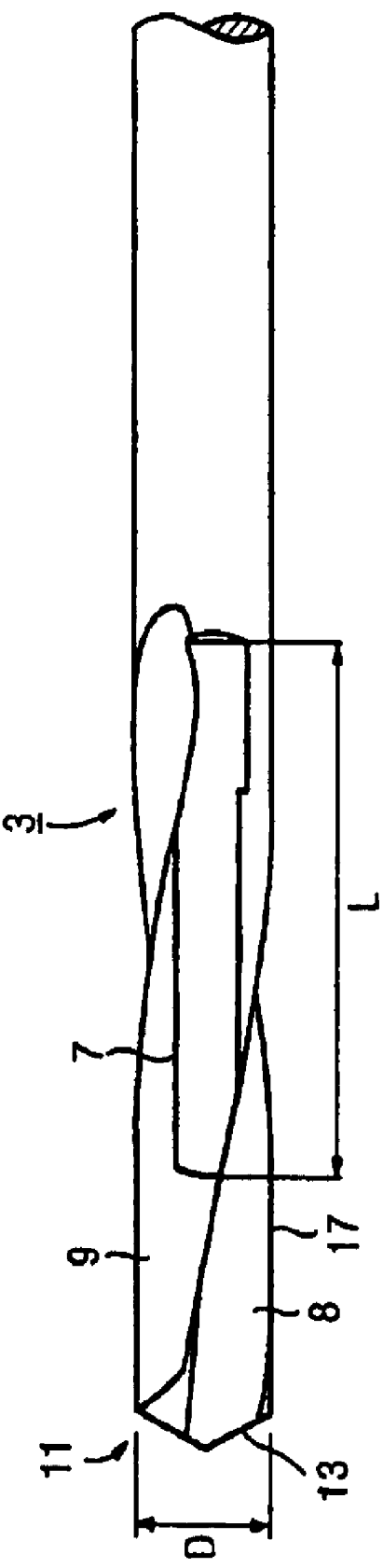

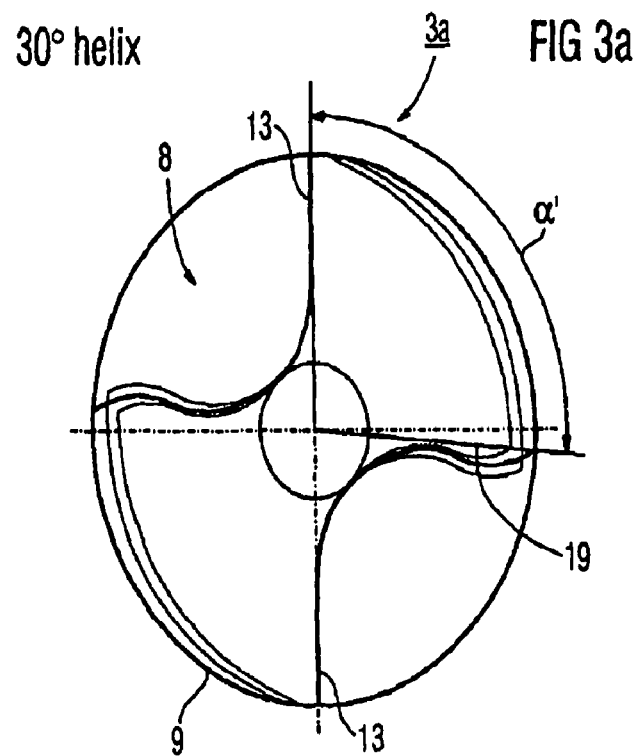
30° helix　　　FIG 3a
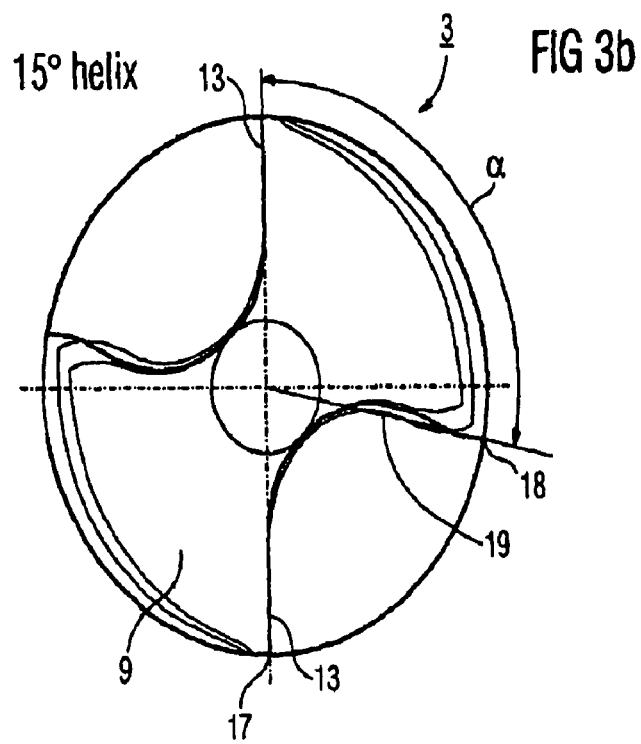
15° helix　　　FIG 3b

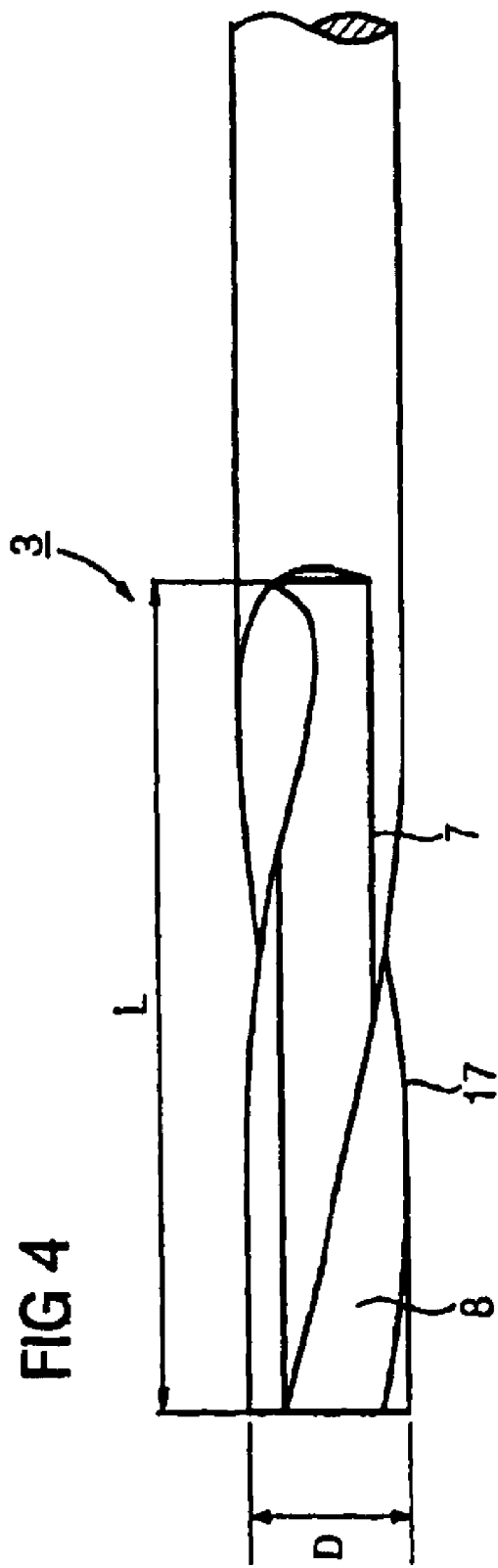

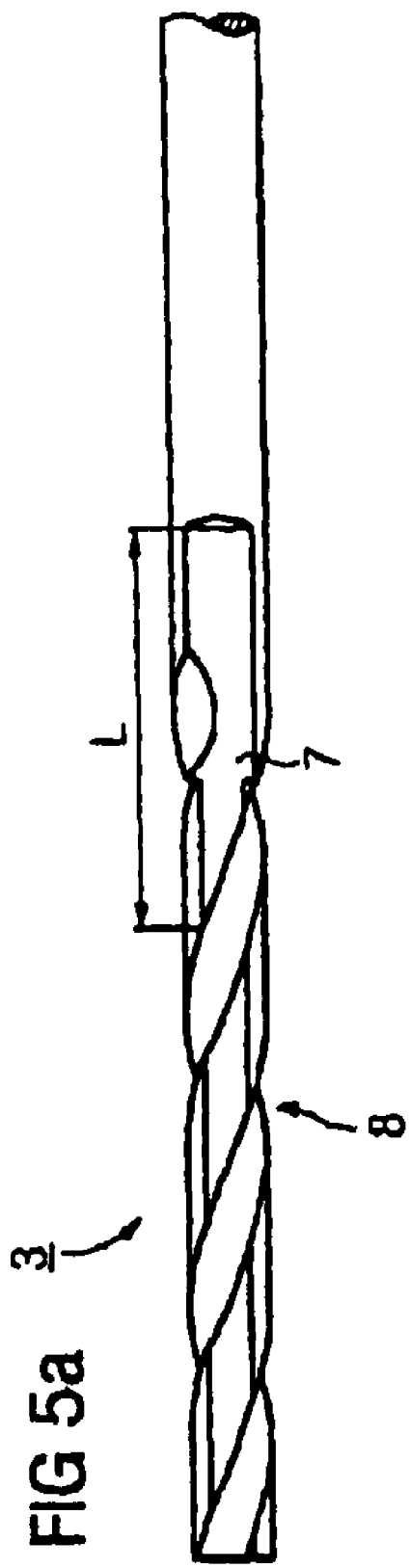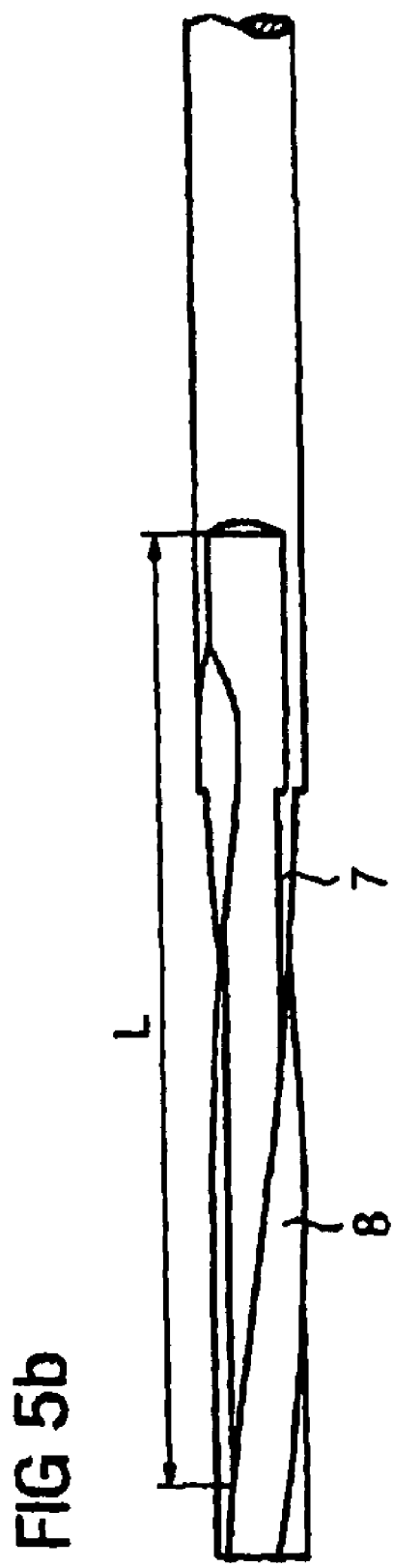

TWIST DRILL FOR DRILLING WITH A COUNTERSINK CUTTING ARRANGEMENT, AND A CUTTING TOOL WITH A COUNTERSINK CUTTING ARRANGEMENT, AND A CUTTING-CHAMFERING TOOL

CONTINUING APPLICATION DATA

This application is a Continuation-In-Part application of International Patent Application No. PCT/EP2005/012560, filed on Nov. 24, 2005, which claims priority from Federal Republic of Germany Patent Application No. 10 2004 058 163.0, filed on Dec. 2, 2004. International Patent Application No. PCT/EP2005/012560 was pending as of the filing date of this application. The United States was an elected state in International Patent Application No. PCT/EP2005/012560.

BACKGROUND

1. Technical Field

This application relates to a twist drill for drilling with a countersink cutting arrangement, and a cutting tool with a countersink cutting arrangement, and a cutting-chamfering tool.

2. Background Information

This application relates to a drill for a drilling/chamfering tool as well as to a drilling/chamfering tool, i.e. a combination tool for metal-cutting machining of material, which is suitable for both drilling and chamfering. A drilling/chamfering tool is known, for example, from Federal Republic of Germany Patent Publication No. 92 06 148 U1.

A drilling/chamfering tool is usually composed of a base body or clamping ring carrying a cutting insert, such as an indexable insert, as chamfering tool and a drill clamped in the base body or clamping ring, the cutting insert being fastened on the base body or clamping ring in such a way that the cutting edge provided for generating a chamfer partly engages into a chip space of the twist drill. It is, therefore, not possible to clamp the drill in the base body or clamping ring in any desired is position. When adjusting the drilling depth, as far as possible, one has to make sure that the correct angular relation between the drill and the cutting insert for the chamfering operation is re-established.

Instead of fixing the chamfering insert with partial engagement in a chip flute of the drill, it is also possible, as known, for example, from International Patent Publication No. WO 94/25210, to fasten the chamfering insert on the base body or clamping ring in such a way that it is pressed against a groove bearing flank of the drill. In the tool known from International Patent Publication No. WO 94/25210, the chamfering insert is adjustable at right angles to the drill axis, so that the tool can be suitable for different drill diameters. When the drill is adjusted in longitudinal direction, the angle between drill and base body or clamping ring must in this tool also be adjusted anew.

International Patent Publication No. EP 0 519 233 A1 describes a drilling tool on whose outer periphery dovetail guides are formed on which an additional cutting member can be fastened and shifted in longitudinal direction. Furthermore, International Patent Publication No. EP 068 499 A1 describes a drilling/chamfering tool in which a drill with helical chip flutes can be inserted into an adaptor of the drilling/chamfering tool in such a way that it is shiftable in longitudinal direction. The longitudinal shift requires in this case a rotational movement of the drill, as the latter includes in the area of its shank a helical cutting face or guide face. The lead of the cutting face corresponds to the lead of the chip flutes, so that it is guaranteed that in case of a longitudinal adjustment, one chamfering insert will always abut the outer periphery of the drill in an area between the chip flutes.

Another problem of drilling/chamfering tools is the supply of cooling lubricant to the drill: cooling lubricant which is supplied through a central hole to the base body or clamping ring flows from the latter into the chip flutes of the drill. A purposeful supply of cooling lubricant to the cutting edges of the drill, which is necessary with minimum-quantity lubrication, is in this way at best possible to a limited extent only. Until now, drilling/chamfering tools according to the state of the art have been designed without coolant channels inside the drilling tool, which would enable a more purposeful supply of small quantities of cooling lubricant to the drill tip, because such channels would reduce the cross-section and thus the load-bearing capacity of the drill. The limited cooling and lubricating possibilities, on the other hand, lead to the fact that drilling/chamfering tools according to the state of the art are mainly used for smaller, maximally for medium drilling depths up to approximately three times the drill diameter.

OBJECT OR OBJECTS

An object of at least one possible embodiment of the present application is to provide a flexible, easily handleable device for drilling and chamfering, which is suitable also for drilling depths of more than three times the drill diameter, offering at the same time good cooling and lubricating possibilities. Another object of at least one possible embodiment of the present application is to use the drill in a simple way in different combination tools, such as drilling/chamfering tools.

SUMMARY

At least one possible embodiment of the present application teaches a drill for longitudinally variable clamping in a drilling/chamfering tool with an axis extending in longitudinal direction, with a diameter, with chip flutes with a helix angle of maximally or essentially maximally 25 relative to the axis of the drill, with one coolant channel per chip flute, as well as with a bearing face extending in longitudinal direction, which is provided for bearing a cutting insert of the drilling/chamfering tool with a bearing length. At least one possible embodiment of the present application teaches a drill for longitudinally variable clamping in a drilling/chamfering tool with an axis extending in longitudinal direction, with a diameter, with chip flutes with a helix angle of maximally or essentially maximally 25° relative to the axis of the drill, with a coolant channel per chip flute, as well as with a bearing face extending in longitudinal direction, which is provided for bearing a cutting insert of the drilling/chamfering tool with a bearing length, the bearing face being delimited or essentially delimited by two partial portions of the chip flutes crossing the longitudinal direction and being formed as a flattened or essentially flattened, level portion of a rounded or essentially rounded drill back, and the lateral boundary lines of the bearing face extending parallelly or essentially parallelly to the longitudinal direction. In at least one possible embodiment of the present application, this drill is provided for use in a drilling/chamfering tool, but also for use in other combination tools, for example tools with a countersinking bit or a reaming bit. At least one possible embodiment of the tool comprises a base body or clamping ring and the drill clamped in it in a longitudinally variable manner, i.e. with adjustable drilling depth. In at least one possible embodiment, a cutting insert, for example in the form of an indexable insert, is fastened as a chamfering tool on the base body or clamping ring in whose drill adaptor the drill can be clamped. In at least one possible embodiment, the drill possesses helical chip flutes as well as at least one channel per chip flute for a cooling lubricant. In at least one possible embodiment, the cooling lubricant channels can either extend through the entire drill or be brought together inside the drill. In at least one possible embodiment, on the periphery of the drill, a flat or essentially flat bearing face extending parallel or essentially parallel to the drill axis is formed per chip flute, enabling an easy longitudinal adjustment of the drill in the base body or clamping ring. It is an advantage, in at least one possible embodiment, that with the longitudinal adjustment of the drill, the latter's angular position and thus also the angular relation between the drill and the cutting insert on the base body or clamping ring do not have to be changed, so that the longitudinal adjustment is effected exclusively or essentially exclusively by an axial shifting of the drill in longitudinal direction, without any or essentially any rotational movement. At the same time, in at least one possible embodiment, a sufficient adjustment travel of the drill is given, as the chip flutes of the drill are twisted at a small angle only, of maximally 25°, or even at an angle of maximally 20°. In at least one possible embodiment, the small helix angle of the chip flutes, measured relative to the longitudinal axis of the drill, offers, furthermore, the advantage that the torsional stability is increased in comparison with a drill with a stronger twist. The drill is, therefore, in at least one possible embodiment, also suited for larger drilling depths of more than 3×D, for example 8×D (D=drill diameter) or 15×D. Independently of the drilling depth, in at least one possible embodiment, a purposeful supply of cooling lubricant to the drill tip will in any case be given, even in case of minimum-quantity lubrication, through the cooling lubricant channels extending inside the drill. It is an advantage, in at least one possible embodiment, that the features of the drill and of the drilling/chamfering tool can be realized in a modular tool.

In at least one possible embodiment, the drill is suitable for wide diameter ranges, such as from 1.5 mm to 30 mm, the helix angle and thus the lead of the chip flutes being selected as a function of the drill diameter. In at least one possible embodiment, the helix angle which the chip flutes form with the longitudinal axis of the drill increases with increasing drill diameter. According to at least one possible embodiment, the helix angle of the chip flutes, given in degrees, differs from the value $7 \times D^{0.35}$, the diameter D of the drill being given in mm, by not more than 20%, possibly by not more than 10%.

By the lead of a chip flute, one understands the portion on the longitudinal axis of the drill within which the chip flute, in at least one possible embodiment, describes a full revolution, so that the lead of the chip flute corresponds to the conventional term of the pitch of a thread. According to at least one possible embodiment of the present application, the lead of the chip flute, given in mm, differs from the value $24 \times D^{2/3}$, the drill diameter D also being given in mm, by not more than 20%, possibly by not more than 10%, or possibly even by not more than 5%.

According to at least one possible embodiment of the present application, another dependency exists in drills of different diameters in at least one possible embodiment design between the bearing face of the drill, i.e. the face of the drill which the cutting insert of the base body or clamping ring abuts, and the drill diameter. In at least one possible embodiment, the length of the bearing face in axial direction, given in mm, i.e. in longitudinal direction of the drill, differs from the value $0.2 \times D^2 - 0.8 \times D + 30$ by maximally 25%, possibly by maximally 10%, for example possibly by less than 5%, all values in the before-mentioned formula having to be given in mm.

In at least one possible embodiment of the present application, a high variability of the drilling/chamfering tool is given by the fact that the length of the bearing face in axial direction of the drill is at least double the bearing length of the cutting insert. By bearing length of the cutting insert, one understands the length on which the cutting insert provided for producing a chamfer on the drill-hole abuts the bearing face of the drill, in at least one possible embodiment.

In at least one possible embodiment of the present application, the drill of the drilling/chamfering tool includes two chip flutes. In at least one possible embodiment, a high stability is given by the fact that the drill back, viewed in cross-section of the drill, extends between the chip flutes over an angle of at least 95°, possibly an angle of at least 100°, or even possibly more than 110°. In general, according to at least one possible embodiment of the present application, there exists a dependency between the material to be machined and the optimum design of the chip flutes. In at least one possible embodiment of the present application, contrary to the above-mentioned high values of the angle of the drill back, the angle over which the drill back extends can be in the drilling/chamfering tool, if it is intended, for example, for light-metal machining, less than 60°, possibly less than 45°. With regard to chip evacuation, in at least one possible embodiment of the present application, the geometry of the drill is optimized by the fact that the web diameter of the drill decreases with increasing distance from the drill tip. In at least one possible embodiment, the space available for chip evacuation in the chip flutes thus increases towards the rear end, without considerably weakening the cross-section of the drill. In at least one possible embodiment, the web diameter of the drill lies in the range of 0.18×D to 0.35×D (D=drill diameter).

A drill with a web diameter decreasing from the drill tip towards the rear end is known per se, but not in connection with a drilling/chamfering tool, for example from International Patent Application No. EP 0 712 343 B1. There, the cross-section of the chip flute has a shape with a chip-control radius increasing with increasing distance from the drill tip.

Possible materials of the base body or clamping ring, of the chamfering insert to be fixed thereon, as well as of the drill, are all materials suitable in metal-cutting technology. For example, the drill can be designed as a solid-carbide drill or as a steel drill with brazed-on and/or detachably fixed, for example screwed-on, cutting inserts. Suitable materials of the cutting inserts are, depending on the field of application, for example carbide, cermet, PCD (polycrystalline diamond), CBN (cubic boron nitride), or ceramic. The drill can also comprise several parts with an attachable drill tip. In all cases, the cutting edges of the drill can comprise coated or uncoated material. The same applies analogously to the cutting insert, provided as chamfering tool, of the base body or clamping ring. At least one possible embodiment of the present application is a drilling/chamfering tool with a drill with a base body or clamping ring including a drill adaptor as well as a cutting insert as a chamfering tool, the drill being held in the base body or clamping ring in longitudinal direction over a variable length and the cutting insert abutting the bearing face of the drill along a bearing length.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

In the following, at least one possible embodiment of the present application is explained in detail by means of a drawing in which:

FIGS. 1 a-c show different views of a drilling/chamfering tool with 9 mm drill diameter, FIGS. 2a+b show the drill of the drilling/chamfering tool according to FIG. 1 in comparison with a drill with a 30° helix, FIGS. 3a+b are cross-sectional views of the drill according to FIG. 2a as well as of the drill according to FIG. 2b, FIG. 4 shows a drill with 13.5 mm diameter for a drilling/chamfering tool, FIGS. 5a+b show different sections of a drill with 3.4 mm diameter for a drilling/chamfering tool, FIGS. 6a+b is a side view as well as a cross-sectional view of a drill with 13.5 mm diameter and reduced width of the back for a drilling/chamfering tool, and FIGS. 7a+b is a side view as well as a cross-sectional view of drill with 13.5 mm diameter and increased width of the back for a drilling/chamfering tool.

Parts corresponding to each other or acting in the same way are identified by the same reference numbers in all figures.

DESCRIPTION OF EMBODIMENT OR EMBODIMENTS

Figure 6A:
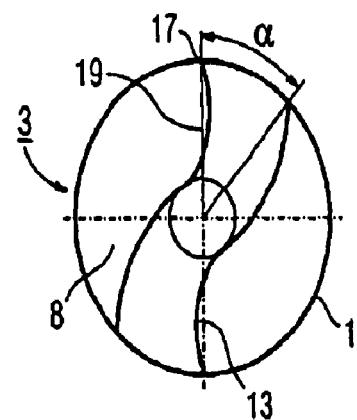

FIGS. 1a to 1c show a drilling/chamfering tool 1, composed of a base body or clamping ring 2 and a drill 3 clamped therein. The base body or clamping ring 2 is chucked with a chucking end (not shown) in a clamping chuck of a machine tool, so that the drill 3 is held in the machine tool only indirectly indirectly, by means of the base body or clamping ring 2. The drilling/chamfering tool 1 or the drill 3 are usually used as a rotating tool, but an application as a stationary tool with rotating workpiece is also possible.

In at least one possible embodiment of the present application, the drill 3 is held in the base body or clamping ring 2 by means of a clamping screw 4 in a longitudinally variable manner, i.e. with adjustable drilling depth. An additional fastening of the drill 3 is given by a cutting insert 5, fastened as a chamfering tool by means of a fastening screw 6 on the base body or clamping ring 2 and abutting a bearing face 7 of the drill 3. Therefore, the possibility of longitudinal adjustment of the drill 3 results from the fact that the latter is shiftable inside the base body or clamping ring 2, and, on the other hand, from the fact that the cutting insert 5 can be fastened in different positions on the bearing face 7. In one possible embodiment, the cutting insert 5 is fastened with the fastening screw 6 in a tight-fitting manner against the bearing face 7, such that the fastening screw 6 and the clamping screw 4 must both be loosened before any substantial longitudinal adjustment of the drill 3 can occur. In at least one possible embodiment, the cutting insert 5 is fastened with the fastening screw 6 in a manner which allows for the cutting insert 5 to abut the bearing face 7 in a secure and less tight-fitting manner, so that at least some longitudinal adjustment of the drill 3 can occur without the loosening of the fastening screw 6. In the embodiment example shown, only one cutting insert 5 is fastened as a chamfering tool on the base body or clamping ring 2; contrary to this, the drilling/chamfering tool 1 could also include several chamfering tools. In at least one possible embodiment, the at least one cutting insert 5 could also be designed as an indexable insert. The length of the bearing face 7 in axial direction of the drill 3 is marked L, the bearing length indicating over which portion of the bearing face 7 the cutting insert 5 contacts the drill 3, is marked AL. In at least one possible embodiment, the bearing length AL is approx. 40% of the length L of the bearing face 7.

The drill 3 includes two helical chip flutes 8 as well as two drill backs 9 lying between them, the bearing faces 7 extending in the area of the drill backs 9 in such a way that the cutting insert 5 engages into a cross-sectional area within the drill diameter. For a longitudinal adjustment of the drill, the latter, contrary to a drilling/chamfering tool in which the chamfering insert engages into a chip flute, does not have to be rotated, but only to be shifted in axial direction.

Inside the drill 3, two coolant channels 10 extend, whose exit openings are located on the end face in the area of the drill tip 11. On the drill tip 11, a chisel edge 12 as well as major cutting edges 13 adjacent to it can be seen. The geometry of the drill 3 in the area of the drill tip 11 is known in principle, for example from International Patent Application No. EP 0 249 104 A1 or from German Patent No. 199 55 172 A1. Accordingly, a flank 14 adjacent to the major cutting edge 13 is formed as a curved surface with a radius of curvature extending from the major cutting edge 13 to the chip flute 8.

On the drill back 9, there is a land 16, adjacent to a minor cutting edge 17 which delimits the chip flute 8. Contrary to the embodiment example shown, in other possible embodiments the drill 3 may also have a land 16 on each side of the drill back 9, i.e. altogether four lands for a tool with two chip flutes 8. The drill 3 can be made of any materials suited for the manufacture of drilling tools, for example tool steel or carbide. It is also possible to manufacture the drill from cermet or to use CBN-coated drilling inserts (cubic boron nitride). The web diameter of the drill 3 decreases from the drill tip 11 towards the rear end, so that the chip flutes 8 are correspondingly enlarged and thus guarantee or essentially guarantee a substantially good chip evacuation. The transition from the chip flutes 8 to the base body or clamping ring 2 is designed in such a way that, when the drill 3 is maximally inserted into the base body or clamping ring 2, i.e. with minimum drilling depth, the outline of the chip flutes 8 is approximately continued by the base body or clamping ring 2. This avoids or substantially avoids an entanglement of chips at the transition between the drill 3 and the base body or clamping ring 2.

Detailed geometrical features of the drill 3 are explained in the following by means of FIGS. 2a to 3b. FIGS. 2b and 3b show a side view and a cross-sectional view, respectively, of the drill 3 of the drilling/chamfering tool 1 according to FIGS. 1a to 1c, while FIGS. 2a and 3a show, for comparison, a fictitious drilling tool 3a, which differs from the drilling tool 3 in the chip flutes, but for the rest also possesses, as far as possible, the latter's features.

The drilling tool 3a shown in FIGS. 2a and 3a is provided with a helix of the chip flutes 8 of 30°, referred to the axis A of the drilling/chamfering tool 1. In so far, the drilling tool 3a corresponds to conventional drills. A bearing face 7' visible in FIG. 2a and interrupted by a chip flute 8 is only shown for the purpose of comparison with the drill 3 according to FIGS. 2b, 3b as well as 1a to 1c.

The drill 3 according to FIGS. 2b and 3b, forming a part of the drilling/chamfering tool 1, has a diameter D of 9 mm, just like the comparative drilling tool 3a according to FIGS. 2a and 3a. The helix angle of the chip flutes 8, i.e. the inclination to the longitudinal axis A of the tool, is in the drill 3 only 15° and, thus, half of the typical value for conventional drills of similar dimensioning. The smaller helix angle of the chip flutes 8 of the drill 3 increases, on the one hand, the mechanical stability, such as with larger drilling depths, as compared with the drilling tool 3a, where the chip flutes have a more pronounced inclination, and enables, on the other hand, a very elongated shape of the bearing face 7 and, therefore, a wide adjustment range of the drill 3 in the base body or clamping ring 2. In the embodiment example with a drill diameter D=9 mm, the length L of the bearing face 7 is approximately 26 mm. This corresponds approximately to the value of $6 \times D^{2/3}$, all indications being given in mm. Drills of the kind of embodiment examples shown in FIGS. 2b and 3b can be manufactured with different diameters, such as with diameters of 1.5 mm to 30 mm, diameter ranges between 4 mm and 20 mm being possible. In at least one possible embodiment of the present application, the length L of the bearing face 7 differs from the value $6 \times D^{2/3}$ by not more than 25%, for example by maximally 15% (all length indications in mm). It is possible to manufacture embodiments of drills for a drilling/chamfering tool 1, in which the length L exceeds the value $6 \times D^{2/3}$, even by more than 25%. A direct comparison between FIGS. 2b and 2a shows that such a long bearing face 7 cannot sometimes, or often, or generally, or in some cases, even be realized in a drill with a helix angle of 30°.

A helical chip flute of a drill describes in general a helix which is in principle comparable with the turn of a thread. Therefore, in the following, the term "lead of a chip flute" will be used, indicating, analogously to the lead of a thread, the length, in this case along the tool axis, within which the chip flute describes a full revolution. In the drilling tool 3a according to FIGS. 2a and 3a, the chip flutes extend approximately over a length corresponding to the lead of the chip flutes 8, while the drill 3 according to FIGS. 2b and 3b possesses chip flutes 8 which turn around the tool axis clearly less than by one revolution. Thus, in this case, the lead of the chip flutes 8a, constituting a calculated comparative value, exceeds the portion of the length of the drill 3 over which the chip flutes 8 actually extend.

Like the length L of the bearing face 7, the lead of the chip flutes 8 of the drill 3 in at least one possible embodiment example also depends on the drill diameter D. In at least one possible embodiment of the present application, the lead of the chip flutes differs from the value $24 \times D^{2/3}$ by not more than 20%, possibly by not more than 10%, all indications being again given in mm. This relation between drill diameter D and design of the chip flutes 8 is also valid for a drill diameter D in the range from 4 mm to 20 mm. In at least one possible embodiment with a helix of the chip flutes 8 of 15° and a drill diameter D of 9 mm, the lead of the chip flutes 8 amounts to approximately 105 mm. In at least one possible embodiment of the present application, the drill 3, as part of the drilling/chamfering tool 1, is suitable for drilling depths up to about 3×D. With smaller drill diameters, the drilling depth of the drilling/chamfering tool 1 can be up to 15×D. In at least one possible embodiment of the present application, the axial adjustment possibility of the drill 3, determined by the length L of the bearing face 7 as well as the geometry of the cutting insert 5 with the bearing length AL, amounts to at least 75% of the drill diameter D.

FIGS. 3a and 3b show in cross-sectional views another essential difference between the drill 3 of the drilling/chamfering tool 1 and the comparative drilling tool 3a with a constant helix angle of 30°. The cross-section of the back 9 of the drill 3 extends over an angle α of approximately 100°, while the comparative angle α', over which the back 9 of the drilling tool 3a extends, is smaller or somewhat smaller than 95°. The different widths of the drill back 9 result from the different leads of the chip flutes 8 and the use of an adapted grinding tool. In the area adjacent to the minor cutting edges 17, the chip flutes 8 of the drill 3, on the one hand, and those of the comparative drill 3a, on the other hand, are of almost identical shape, so that no essential differences exist between the drill 3 and the comparative drill 3a concerning the chip control inside the chip flutes 8 after the minor cutting edges 17, whereas in the area of the longitudinal edges 18 of the drill back 9, opposite the minor cutting edges 17 in the chip flutes 8, the chip flutes 8 of the drill 3 differ clearly from those of the comparative drill 3a. As to the drill 3, there is possibly much material near the periphery of the drill, i.e. near the drill back 9. This is evident, for example, through the fact that a radial line 19 extending from the axis A of the drill 3 to the longitudinal edge 18 partly passes through the chip flute 8, whereas the radial line 19 of the comparative drill 3a extends exclusively through the drill material. Due to the relatively large dimension of the back 9 of the drill 3, the latter has even with two coolant channels 10 (not shown in FIG. 3b) a good mechanical stability inside the drilling/chamfering tool 1, in spite of large drilling depths/diameter ratios (possibly up to 8×D, or such as up to 5×D). Furthermore, the drill back broadened in this way offers more space to guarantee the largest possible bearing face 7 for the chamfering insert 5 and thus a high axial adjustability. Chip control and chip transport are not impaired by this, as described. Various alternative designs of the drill back 9 are indicated by individual lines inside the cross-section of the drill. The angle α depends to a low or somewhat low extent on the shape of the drill back 9.

FIG. 4 is a section of a drill 3 with a diameter D of 13.5 mm, which is also suited for a drilling/chamfering tool 1, not shown in detail. The helix angle of the chip flutes 8 is in this case 17.3°, the maximum length L of the bearing face 7 is 56.35 mm (in the embodiment example according to FIG. 4, the bearing face 7 is shorter, it could, however, be extended to 56.35 mm by a different grinding).

FIGS. 5a and 5b show in different sections a drill 3 of a drilling/chamfering tool 1 with a drill diameter D of 3.4 mm. In at least one possible embodiment of the present application, the helix angle of the chip flutes 8 is only 9.58°, the maximum length L of the bearing face 7 for the cutting insert 5 is 28.84 mm. As becomes evident from a comparison of the embodiment example according to FIGS. 5a and 5b with the embodiment example according to FIG. 4 as well as with the embodiment examples according to FIGS. 1a-1c and 2b, 3b, the chip flutes 8 of the drill 3 are the less helical, i.e. the more similar to the shape of a drill with straight chip flutes, the smaller the drill diameter D.

Figure 6B:
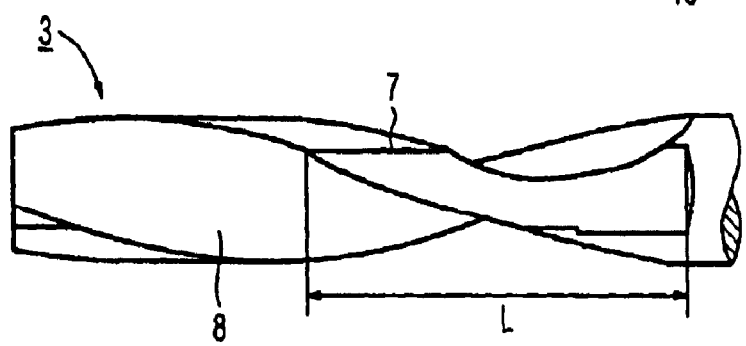
Figure 7A:
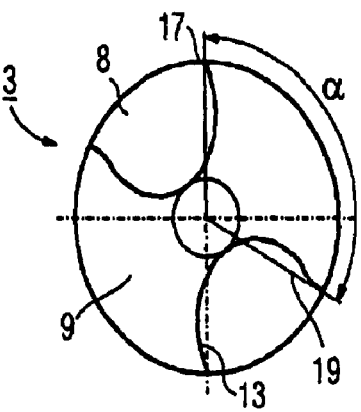
Figure 7B:
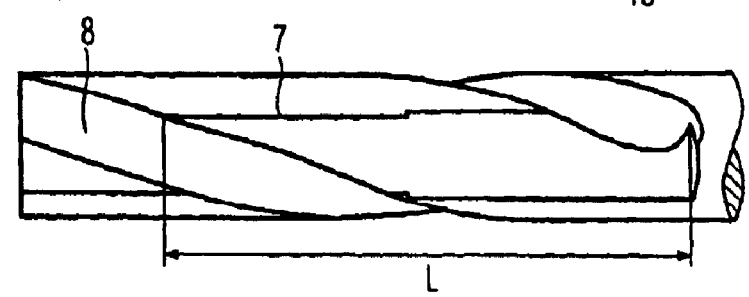

Special shapes of drills 3 with a diameter D of 13.5 mm in each case and a helix angle of 17.3° are shown in FIGS. 6a and 6b as well as in FIGS. 7a and 7b. The drill 3 according to FIGS. 6a and 6b possesses wide chip flutes 8 as well as a correspondingly small width of the back with an angle α, over which the drill back 9 extends, of only 43°. Through the reduced width of the back, the maximum length L of the bearing face 7 is reduced in comparison with the embodiment example according to FIG. 4, namely to 43.11 mm. Nevertheless, a sufficient longitudinal adjustability of the drill 3 within the drilling/chamfering tool 1 is given. The drill 3 according to FIGS. 6a and 6b is suited for machining light metals or light-metal alloys.

In the embodiment example according to FIGS. 7a and 7b, the drill 3 possesses, in comparison with the embodiment example according to FIG. 4a, an increased width of the back with an angle α of 117°. The chip flutes 8 are correspondingly reduced, the maximum length L of the bearing face 7 is increased to 59.5 mm. The drill 3 with reinforced back 9 is suited for machining short-chipping materials, such as cast materials. In a way not shown, coolant channels 10 also extend inside the drill 3 of the embodiment example according to FIGS. 6a and 6b as well as according to FIGS. 7a and 7b. Lands 16 are also provided, at least on the minor cutting edges 17. In each of the above-described possible embodiments, the drill tip 11 can be formed by a separate part to be connected with the rest of the drill 3. It is also possible to fasten individual cutting inserts on the drill tip 11 in a detachable or permanent manner.

At least one possible embodiment of the present application is a drilling/chamfering tool which comprises a base body or clamping ring 2 including a drill adaptor and a cutting insert 5 as a chamfering tool, as well as a drill 3 with a diameter D, held in a longitudinally variable manner in the drill adaptor and having chip flutes 8 with a helix angle of maximally 25° relative to the axis A of the drill 3, a coolant channel 10 as well as a bearing face 7, which the cutting insert 5 abuts along a bearing length AL.

The components disclosed in the various publications, disclosed or incorporated by reference herein, may possibly be used in possible embodiments of the present invention, as well as equivalents thereof.

The corresponding foreign and international patent publication applications, namely, Federal Republic of Germany Patent Application No. 10 2004 058 163.0, filed on Dec. 2, 2004, having inventors Werner REINHARDT, Jürgen SCHWÄGERL, and Petra HOLZNER, and DE-OS 10 2004 058 163.0 and DE-PS 10 2004 058 163.0, and International Application No. PCT/EP2005/012560, filed on Nov. 24, 2005, having WIPO Publication No. WO2006/058651 A1 and inventors Werner REINHARDT, Jürgen SCHWÄGERL, and Petra HOLZNER, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

One feature or aspect of an embodiment is believed at the time of the filing of this patent application to possibly reside broadly in a tool for drilling countersunk holes comprising: a twist drill having a central longitudinal axis; said drill comprising a fluted portion and a shank portion; said fluted portion comprising: at least one helical chip flute; at least one helical land or back disposed adjacent said at least one chip flute; at least one helical cutting edge disposed adjacent said at least one chip flute; said at least one helical cutting edge being configured and disposed to define an angle relative to the central longitudinal axis of about 25 degrees; a clamping ring being configured and disposed to surround a portion of said drill; said clamping ring comprising at least one fastening arrangement being configured and disposed to clamp said clamping ring to said drill; said clamping ring comprising a countersinking arrangement; said countersinking arrangement comprising a cutting insert; said clamping ring comprising a fastening arrangement being configured and disposed to fasten said cutting insert to said clamping ring; said drill comprising a flat bearing face being disposed along one of said at least one land, substantially parallel to and along the longitudinal axis of a substantial portion of said fluted portion of said drill; said flat bearing face having a width and a length greater than said width, and being configured and disposed to permit said cutting insert to abut and bear against said flat bearing face; said cutting insert being configured and disposed to bear against said flat bearing face and being slideable along said flat bearing face; said fastening arrangement being configured and disposed to press said cutting insert against said flat bearing face; said flat bearing face being configured to permit said clamping ring to be moveably relocated longitudinally along said drill substantially parallel to the longitudinal axis; said flat bearing face having a sufficient width and a length to permit said cutting insert to be positioned at a plurality of locations along a substantial portion of the length of said fluted portion of said drill; said clamping ring being configured to be moved and fastened at a plurality of locations along a substantial portion of the length of said fluted portion of said drill; and said cutting insert and said flat bearing face being configured to permit substantial relative movement of said cutting insert along the length of said flat bearing face and to permit substantial relative movement between said clamping ring and said drill essentially without twisting or rotating said clamping ring on said drill.

Yet another feature or aspect of an embodiment is believed at the time of the filing of this patent application to possibly reside broadly in a drill 3 for longitudinally variable clamping such as in a drilling/chamfering tool with an axis A extending in longitudinal direction, with a diameter D, with chip flutes 8 with a helix angle of maximally 25° relative to the axis A of the drill 3, with one coolant channel 10 per chip flute 8, as well as with a bearing face 7 extending in longitudinal direction, which is provided for bearing a cutting insert 5 of the drilling/chamfering tool with a bearing length AL.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Still another feature or aspect of an embodiment is believed at the time of the filing of this patent application to possibly reside broadly in a tool for drilling countersunk holes comprising: a drill having a central longitudinal axis; said drill comprising a fluted portion and a shank portion; said fluted portion comprising at least one chip flute and at least one land or back disposed adjacent said at least one chip flute; a clamping ring being configured and disposed to surround a portion of said drill; said clamping ring comprising at least one fastening arrangement being configured and disposed to clamp said clamping ring to said drill; said clamping ring comprising a countersinking arrangement; said countersinking arrangement comprising a cutting insert; said clamping ring comprising at least one fastening arrangement being configured and disposed to fasten said cutting insert to said clamping ring; said drill comprising a flat bearing face being disposed along one of said at least one land, substantially parallel to and along the longitudinal axis of a substantial portion of said fluted portion of said drill; said flat bearing face having a width and a length greater than said width, and being configured and disposed to permit said cutting insert to abut and bear against said flat bearing face; said cutting insert being configured and disposed to bear against said flat bearing face and being slideable along said flat bearing face; said at least one fastening arrangement being configured and disposed to press said cutting insert against said flat bearing face; said flat bearing face being configured to permit said clamping ring to be moveably relocated longitudinally along said drill substantially parallel to the longitudinal axis; said flat bearing face having a sufficient width and a length to permit said cutting insert to be positioned at a plurality of locations along a substantial portion of the length of said fluted portion of said drill; said clamping ring being configured to be moved and fastened at a plurality of locations along a substantial portion of the length of said fluted portion of said drill; and said cutting insert and said flat bearing face being configured to permit substantial relative movement of said cutting insert along the length of said flat bearing face and to permit substantial relative movement between said clamping ring and said drill without substantial twisting or rotation of said clamping ring on said drill.

Another feature or aspect of an embodiment is believed at the time of the filing of this patent application to possibly reside broadly in a drill 3 for longitudinally variable clamping such as in a drilling/chamfering tool with an axis A extending in longitudinal direction, with a diameter D, with chip flutes 8 with a helix angle of maximally 25° relative to the axis A of the drill 3, with a coolant channel 10 per chip flute 8, as well as with a bearing face 7 extending in longitudinal direction, which is provided for bearing a cutting insert 5 of the drilling/chamfering tool with a bearing length AL, the bearing face 7 being delimited by two partial portions of the chip flutes 8 crossing the longitudinal direction and being formed as a flattened, level portion of a rounded drill back 9, and the lateral boundary lines of the bearing face 7 extending parallelly to the longitudinal direction.

The appended drawings in their entirety, including all dimensions, proportions and/or shapes in at least one embodiment of the present application, are accurate and are hereby included by reference into this specification.

Another feature or aspect of an embodiment is believed at the time of the filing of this patent application to possibly reside broadly in a kit for a tool for drilling countersunk holes comprising: a drill having a central longitudinal axis; said drill comprising a fluted portion and a shank portion; said fluted portion comprising at least one chip flute and at least one land or back disposed adjacent said at least one chip flute; a clamping ring being configured to be clamped onto said drill and to surround a portion of said drill; said clamping ring comprising at least one fastening arrangement being configured to clamp said clamping ring to said drill; a cutting insert being configured to be fastened to said clamping ring to form a countersinking arrangement; said clamping ring comprising at least one fastening arrangement being configured to fasten said cutting insert to said clamping ring; said drill comprising a flat bearing face being disposed along one of said at least one land, substantially parallel to and along the longitudinal axis of a substantial portion of said fluted portion of said drill; said flat bearing face having a width and a length greater than said width, and being configured to permit said cutting insert to abut and bear against said flat bearing face; said cutting insert being configured to bear against said flat bearing face and being slideable along said flat bearing face; said at least one fastening arrangement being configured to press said cutting insert against said flat bearing face; said flat bearing face being configured to permit said clamping ring to be moveably relocated longitudinally along said drill substantially parallel to the longitudinal axis; said flat bearing face having a sufficient width and a length to permit said cutting insert to be positioned at a plurality of locations along a substantial portion of the length of said fluted portion of said drill; said clamping ring being configured to be moved and fastened at a plurality of locations along a substantial portion of the length of said fluted portion of said drill; and said cutting insert and said flat bearing face being configured to permit substantial relative movement of said cutting insert along the length of said flat bearing face and to permit substantial relative movement between said clamping ring and said drill without substantial twisting or rotation of said clamping ring on said drill.

Yet another feature or aspect of an embodiment is believed at the time of the filing of this patent application to possibly reside broadly in the drill 3, wherein the helix angle der chip flutes 8 given in degrees differs from the value $7 \times D^{0.35}$, the diameter D being given in mm, by not more than 20%.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Still another feature or aspect of an embodiment is believed at the time of the filing of this patent application to possibly reside broadly in the drill 3, wherein the length L of the bearing face 7 in axial direction differs from the value $0.2 \times D^2 - 0.8 \times D + 30$ (all given in mm) by maximally 25%.

Yet another feature or aspect of an embodiment is believed at the time of the filing of this patent application to possibly reside broadly in a drill being configured to be inserted into a clamping ring in a tool for drilling countersunk holes, said drill having a central longitudinal axis and comprising: a fluted portion; a shank portion; said fluted portion comprising at least one chip flute and at least one land or back disposed adjacent said at least one chip flute; a flat bearing face being disposed along one of said at least one land, substantially parallel to and along the longitudinal axis of a substantial portion of said fluted portion of said drill; said flat bearing face having a width and a length greater than said width, and being configured to permit a cutting insert of a clamping ring to abut and bear against and slide along said flat bearing face; said flat bearing face being configured to permit a clamping ring to be moveably relocated longitudinally along said drill substantially parallel to the longitudinal axis without substantial twisting or rotation of the clamping ring on said drill; and said flat bearing face having a sufficient width and a length to permit a cutting insert of a clamping ring to be positioned at a plurality of locations along a substantial portion of the length of said fluted portion of said drill.

All, or substantially all, of the components and methods of the various embodiments may be used with at least one embodiment or all of the embodiments, if more than one embodiment is described herein.

A further feature or aspect of an embodiment is believed at the time of the filing of this patent application to possibly reside broadly in the drill 3, wherein the length L of the bearing face 7 in axial direction is at least double a bearing length AL of a cutting insert 5 designed as a chamfering tool, with which the cutting insert 5 in clamped condition abuts the bearing face 7.

Still another feature or aspect of an embodiment is believed at the time of the filing of this patent application to possibly reside broadly in a cutting insert being configured to be fastened to a clamping ring in a tool for drilling countersunk holes, said cutting insert comprising: at least one cutting edge; a bearing surface being configured to be pressed to bear against a flat bearing face of a drill on which a clamping ring is attached, which flat bearing face is disposed along a land of the drill substantially parallel to and along the longitudinal axis of a substantial portion of the drill; and said bearing surface being configured to permit said cutting insert to be slid along a flat bearing face of a drill on which a clamping ring is attached substantially parallel to the longitudinal axis of the drill to permit said cutting insert to be positioned at a plurality of locations along a substantial portion of the length of the drill without substantial twisting or rotation of the clamping ring on the drill.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Another feature or aspect of an embodiment is believed at the time of the filing of this patent application to possibly reside broadly in the drill 3, wherein a drill back 9 extends between two chip flutes 8 over an angle α of at least 95°.

All of the patents, patent applications and publications recited herein, and in the Declaration attached hereto, are hereby incorporated by reference as if set forth in their entirety herein.

Yet another feature or aspect of an embodiment is believed at the time of the filing of this patent application to possibly reside broadly in the drill 3, wherein the drill back 9 extends over an angle α of least 95°.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Still another feature or aspect of an embodiment is believed at the time of the filing of this patent application to possibly reside broadly in the drill 3, wherein its drilling depth is at least 3×D.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

A further feature or aspect of an embodiment is believed at the time of the filing of this patent application to possibly reside broadly in the drill 3, wherein a web diameter decreases with increasing distance from the drill tip 11 and lying in the range of 0.18×D to 0.35×D.

Another feature or aspect of an embodiment is believed at the time of the filing of this patent application to possibly reside broadly in the drill 3, wherein it is designed as a solid-carbide drill.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Yet another feature or aspect of an embodiment is believed at the time of the filing of this patent application to possibly reside broadly in the drill 3, wherein it includes several cutting inserts, possibly made of carbide, cermet, PCD, CBN or ceramic.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

Still another feature or aspect of an embodiment is believed at the time of the filing of this patent application to possibly reside broadly in the drill 3, wherein the cutting inserts are brazed on.

The details in the patents, patent applications and publications may be considered to be incorporable, at applicant's option, into the claims during prosecution as further limitations in the claims to patentably distinguish any amended claims from any applied prior art.

A further feature or aspect of an embodiment is believed at the time of the filing of this patent application to possibly reside broadly in the drill 3, wherein the cutting inserts are detachably fastened.

All of the patents, patent applications or patent publications, which were cited in the International Search Report dated Apr. 3, 2006, and/or cited elsewhere are hereby incorporated by reference as if set forth in their entirety herein as follows: European Patent Publication No. 0 519 233 A, European Patent Publication No. 0 684 099 A, United States Patent Publication No. 4 353 670 A, European Patent Publication No. 0 893 185 A, and United States Patent Publication No. 6 238 151 B1.

Another feature or aspect of an embodiment is believed at the time of the filing of this patent application to possibly reside broadly in the drilling/chamfering tool with a drill 3 as well as with a base body or clamping ring 2 including a drill adaptor as well as a cutting insert 5 as a chamfering tool, the drill 3 being held in the base body or clamping ring 2 in longitudinal direction over a variable length and the cutting insert 5 abutting the bearing face 7 of the drill 3 along a bearing length AL.

All of the patents, patent applications or patent publications, which were cited in the International Search Report dated Jan. 17, 2007, and/or cited elsewhere are hereby incorporated by reference as if set forth in their entirety herein as follows: United States Patent Publication No. A 435 670, and International Patent Publication No. WO 98/42469, International Patent Publication WO 94/25210.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

Some examples of twist drills that may possibly be utilized or adapted for use in at least one possible embodiment may possibly be found in the following patent publications: United States Patent Publication No. 6238151B, Federal Republic of Germany Patent Publication No. 103 31 328 A1, and Federal Republic of Germany Patent Publication No. 7729079.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A tool for drilling countersunk holes comprising:
a twist drill having a central longitudinal axis;
said drill comprising a fluted portion and a shank portion;
said fluted portion comprising:
　at least one helical chip flute;
　at least one helical land disposed adjacent said at least one chip flute;
　at least one helical cutting edge disposed adjacent said at least one chip flute;
　said at least one helical cutting edge being configured and disposed to define an angle relative to the central longitudinal axis of at most 25 degrees;
a clamping ring being configured and disposed to surround a portion of said drill;
said clamping ring comprising at least one fastening arrangement being configured and disposed to clamp said clamping ring to said drill;
a cutting insert configured to make a countersink in a drilled hole;
said clamping ring comprising a fastening arrangement being configured and disposed to fasten said cutting insert to said clamping ring;
said drill comprising a flat bearing face being disposed along and on said at least one land, substantially parallel to and along the longitudinal axis of a substantial portion of said fluted portion of said drill;
said flat bearing face having a width and a length greater than said width, and being configured and disposed to permit said cutting insert to abut and bear against said flat bearing face;
said cutting insert being configured and disposed to bear against said flat bearing face and being slideable along said flat bearing face;
said fastening arrangement being configured and disposed to press said cutting insert against said flat bearing face;
said flat bearing face:
　being configured to permit said clamping ring to be moveably relocated longitudinally along said drill substantially parallel to the longitudinal axis; and
　having a sufficient width and a length to permit said cutting insert to be positioned at a plurality of locations along a substantial portion of the length of said fluted portion of said drill;
said clamping ring being configured to be moved and fastened at a plurality of locations along a substantial portion of the length of said fluted portion of said drill; and
said cutting insert and said flat bearing face being configured to permit substantial relative movement of said cutting insert along the length of said flat bearing face and to permit substantial relative movement between said clamping ring and said drill essentially without twisting or rotating said clamping ring on said drill.

2. The tool according to claim 1, wherein:
said land has a length which extends from said shank portion to a tip of said drill; and
said bearing face extends over more than half of the length of said land to permit said clamping ring to be moveably relocated longitudinally along said drill between a first position, in which the tool is configured to cut a first countersunk hole of a first depth, and a second position, in which the tool is configured to cut a second countersunk hole of a second depth which is less than or equal to half of the first depth, to thereby permit the tool to cut countersunk holes of substantially different depths.

3. The tool according to claim 2, wherein:
said drill comprises:
　at least two chip flutes; and
　a coolant channel per chip flute; and
　said flat bearing face is delimited by two partial portions of said chip flutes crossing the longitudinal axis.

4. The tool according to claim 3, wherein the helix angle of said chip flutes, given in degrees, differs from the value $7 \times D^{0.35}$ (the diameter D being given in millimeters) by not more than 20 percent.

5. The tool according to claim 4, wherein:
the length of said bearing face in the axial direction, differs from the value $(0.2 \times D^2)$ minus $(0.8 \times D) + 30$, in millimeters, by maximally 25 percent;
the length of said bearing face in the axial direction is at least double the bearing length of said cutting insert;
said drill land extends over an angle ($\alpha$) of least 95 degrees;

said tool's drilling depth is at least 3×D; and
a web diameter decreases with increasing distance from the drill tip and lying in the range of 0.18×D to 0.35×D.

6. The tool according to claim 5, wherein one of:
said drill comprises a solid-carbide drill;
said drill comprises several cutting inserts; and
said cutting inserts comprising at least one of: (A) carbide; (B) cermet; (C) PCD; (D) CBN; and (E) ceramic.

7. The tool according to claim 6, wherein said cutting inserts comprising one of:
brazed cutting inserts; and
detachably fastened cutting inserts.

8. A kit for a tool for drilling holes, which holes have a first section having a first diameter and which holes have a second section between the first section and the surface of said workpiece which second section has at least one diameter greater than the first diameter, said kit comprising:
a drill having first diameter and a central longitudinal axis;
said drill comprising a fluted portion and a shank portion;
said fluted portion comprising at least one chip flute and at least one land disposed adjacent said at least one chip flute;
a clamping ring being configured to be clamped onto said drill and to surround a portion of said drill;
said clamping ring comprising at least one fastening arrangement being configured to clamp said clamping ring to said drill;
a cutting insert being configured to be fastened to said clamping ring to form at least one second diameter to form an arrangement for cutting the at least one second diameter;
said clamping ring comprising at least one fastening arrangement being configured to fasten said cutting insert to said clamping ring;
said drill comprising a flat bearing face being disposed along and solely on said at least one land, substantially parallel to and along the longitudinal axis of a substantial portion of said fluted portion of said drill;
said flat bearing face having a width and a length greater than said width, and being configured to permit said cutting insert to abut and bear against said flat bearing face;
said cutting insert being configured to bear against said flat bearing face and being slideable along said flat bearing face;
said at least one fastening arrangement being configured to press said cutting insert against said flat bearing face;
said flat bearing face:
being configured to permit said clamping ring to be moveably relocated longitudinally along said drill substantially parallel to the longitudinal axis; and
having a sufficient width and a length to permit said cutting insert to be positioned at a plurality of locations along a substantial portion of the length of said fluted portion of said drill;
said clamping ring being configured to be moved and fastened at a plurality of locations along a substantial portion of the length of said fluted portion of said drill; and
said cutting insert and said flat bearing face being configured to permit substantial relative movement of said cutting insert along the length of said flat bearing face and to permit substantial relative movement between said clamping ring and said drill without substantial twisting or rotation of said clamping ring on said drill.

9. The kit according to claim 8, wherein:
said land has a length which extends from said shank portion to a tip of said drill; and
said bearing face extends over more than about half of the length of said land to permit said clamping ring to be moveably relocated longitudinally along said drill between a first position, in which the tool is configured to cut a first countersunk hole of a first depth, and a second position, in which the tool is configured to cut a second countersunk hole of a second depth which is less than or equal to about half of the first depth, to thereby permit the tool to cut countersunk holes of substantially different depths.

10. The kit according to claim 9, wherein:
said clamping ring surrounding a portion of said drill;
said at least one fastening arrangement clamping said clamping ring to said drill;
said cutting insert fastening to said clamping ring to form a countersinking arrangement;
said at least one fastening arrangement fastening said cutting insert to said clamping ring;
said flat bearing face being disposed to permit said cutting insert to abut and bear against said flat bearing face;
said cutting insert bearing against said flat bearing face;
said at least one fastening arrangement pressing said cutting insert against said flat bearing face; and
said flat bearing face being disposed to permit said clamping ring to be moveably relocated longitudinally along said drill substantially parallel to the longitudinal axis.

11. The kit according to claim 10, wherein:
said drill comprises at least two chip flutes;
each of said at least two chip flutes comprises a cutting edge configured and disposed to define an angle, relative to the central longitudinal axis, of at most about 25 degrees;
said drill comprises a coolant channel per chip flute; and
said flat bearing face is delimited by two partial portions of said chip flutes crossing the longitudinal axis.

12. The kit according to claim 11, wherein: the helix angle of the chip flutes, given in degrees, differs from the value $7 \times D^{0.35}$ (the diameter D being given in millimeters), by not more than 20 percent.

13. The kit according to claim 12, wherein:
the length of the bearing face in the axial direction differs from the value $(0.2 \times D^2)$ minus $(0.8 \times D) + 30$, in millimeters, by maximally 25 percent;
the length of said bearing face in the axial direction is at least double the bearing length of the cutting insert;
said drill land extends over an angle ($\alpha$) of least 95 degrees;
said tool's drilling depth is at least 3×D; and
a web diameter decreases with increasing distance from the drill tip and lying in the range of 0.18×D 0.35×D.

14. The kit according to claim 13, wherein:
said drill comprises a solid-carbide drill;
said drill comprises several cutting inserts;
said cutting inserts comprise at least one of: (A) carbide; (B) cermet; (C) PCD; (D) CBN; and (E) ceramic; and
said cutting inserts comprise one of:
brazed cutting inserts; and
detachably fastened cutting inserts.

15. A cutting insert in combination with a tool for drilling countersunk holes comprising a clamping ring and a drill inserted into said clamping ring comprising:
a cutting insert comprising at least one cutting edge and a bearing surface;
said cutting insert being fastened to said clamping ring;
said drill having a central longitudinal axis;
said drill comprising:
a fluted portion;

a shank portion;

said fluted portion comprising at least one chip flute and at least one land disposed adjacent said at least one chip flute;

a flat bearing face;

said flat bearing face:

being disposed along and on said at least one land, substantially parallel to and along the longitudinal axis of a substantial portion of said fluted portion of said drill;

has a width and a length greater than said width;

being configured to permit said cutting insert to abut and bear against and slide along said flat bearing face;

being configured to permit said cutting insert to be positioned at a plurality of locations along a substantial portion of the length of said fluted portion of said drill; and being configured to permit said clamping ring to be moveably relocated longitudinally along said drill, substantially parallel to the longitudinal axis without substantial twisting or rotation of said clamping ring on said drill; and said bearing surface of said cutting insert is pressed to bear against said flat bearing face of said drill.

16. The combination according to claim 15, wherein:

said land has a length which extends from said shank portion to a tip of said drill; and said bearing face extends over more than about half of the length of said land to permit said clamping ring to be moveably relocated longitudinally along said drill between at least a first position, in which the tool is configured to cut a first countersunk hole of a first depth, and at least a second position, in which the tool is configured to cut a second countersunk hole of a second depth which is less than or equal to about half of the first depth, to thereby permit the tool to cut countersunk holes of substantially different depths.

17. The combination according to claim 16, wherein:

said drill comprises at least two chip flutes;

each of said at least two chip flutes comprises a cutting edge configured and disposed to define an angle relative to the central longitudinal axis of at most about 25 degrees;

said drill comprises a coolant channel per chip flute; and said flat bearing face is delimited by two partial portions of the chip flutes crossing the longitudinal axis.

18. The combination according to claim 17, wherein the helix angle of the chip flutes, given in degrees, differs from the value $7 \times D^{0.35}$ (the diameter D being given in millimeters) by not more than 20 percent.

19. The combination according to claim 18, wherein the length of the bearing face in the axial direction differs from the value $(0.2 \times D^2)$ minus $(0.8 \times D)$ +30, in millimeters, by maximally 25 percent.

20. The combination according to claim 19, wherein:

the length of the bearing face in the axial direction is at least double a bearing length of the cutting insert;

the drill land extends over an angle ($\alpha$) of at least 95 degrees;

said drill's drilling depth is at least 3×D;

a web diameter decreases with increasing distance from the drill tip and lying in the range of 0.18×D to 0.35×D; and said drill is designed as a solid-carbide drill.

\* \* \* \* \*